US012698861B2

(12) United States Patent
Badger et al.

(10) Patent No.: US 12,698,861 B2
(45) Date of Patent: Aug. 4, 2026

(54) LOW VISCOSITY SEALANT TO PREVENT CORROSION UNDER INSULATION

(71) Applicant: Owens Corning Intellectual Capital, LLC, Toledo, OH (US)

(72) Inventors: Steven R. Badger, Pittsburgh, PA (US); Helen B. Larsen, Pittsburgh, PA (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 781 days.

(21) Appl. No.: 17/637,631

(22) PCT Filed: Aug. 28, 2020

(86) PCT No.: PCT/US2020/048421
§ 371 (c)(1),
(2) Date: Feb. 23, 2022

(87) PCT Pub. No.: WO2021/041819
PCT Pub. Date: Mar. 4, 2021

(65) Prior Publication Data
US 2022/0275901 A1 Sep. 1, 2022

Related U.S. Application Data

(60) Provisional application No. 62/893,882, filed on Aug. 30, 2019.

(51) Int. Cl.
*F16L 59/02* (2006.01)
*F16L 58/00* (2006.01)
*F16L 59/14* (2006.01)

(52) U.S. Cl.
CPC ............. *F16L 59/028* (2013.01); *F16L 58/00* (2013.01); *F16L 59/024* (2013.01); *F16L 59/14* (2013.01)

(58) Field of Classification Search
CPC .............................................. F16L 59/021–024
USPC ................................. 138/148, 156, 157, 170
See application file for complete search history.

(56) References Cited

U.S. PATENT DOCUMENTS

| | | | |
|---|---|---|---|
| 2,717,848 A | 9/1955 | Jaye | |
| 3,432,580 A | 3/1969 | Heidrich et al. | |
| 3,557,840 A * | 1/1971 | Maybee | F16L 59/161 52/794.1 |
| 3,600,352 A | 8/1971 | Dujack | |
| 3,749,692 A | 7/1973 | Scocos et al. | |
| 3,969,309 A | 7/1976 | Wright | |

(Continued)

FOREIGN PATENT DOCUMENTS

EP 0041900 A1 12/1981

OTHER PUBLICATIONS

Office Action from CN Application No. 202080064529.3 dated Mar. 23, 2023.

(Continued)

*Primary Examiner* — David R Deal
(74) *Attorney, Agent, or Firm* — Calfee, Halter & Griswold LLP

(57) ABSTRACT

A cellular glass system for an outer surface of a pipe or vessel. The insulation system has an outer surface and an inner surface and comprised of segments of cellular glass. A sealant is provided at the interface between the individual cellular glass segments and is configured to limit water intrusion and prevent corrosion.

15 Claims, 2 Drawing Sheets

(56) References Cited

U.S. PATENT DOCUMENTS

| | | | |
|---|---|---|---|
| 4,287,245 | A | 9/1981 | Kikuchi |
| 4,857,371 | A | 8/1989 | Mcclintock |
| 5,310,594 | A | 5/1994 | Holland et al. |
| 5,417,901 | A | 5/1995 | Hartman et al. |
| 5,569,750 | A | 10/1996 | Knepper et al. |
| 5,783,274 | A | 7/1998 | Knittel et al. |
| 6,136,216 | A | 10/2000 | Fidler et al. |
| 6,403,180 | B1 | 6/2002 | Barrall |
| 6,403,182 | B1 | 6/2002 | Plummer et al. |
| 6,460,576 | B2 | 10/2002 | Vitoorapakorn |
| 6,782,922 | B1 | 8/2004 | Migliorini et al. |
| 6,921,564 | B1 | 7/2005 | Keenan |
| 6,964,282 | B2 | 11/2005 | Babineau, Jr. et al. |
| 7,446,146 | B2 | 11/2008 | Stevenson et al. |
| 8,465,814 | B2 | 6/2013 | Wang |
| 8,733,762 | B2 | 5/2014 | Barnes |
| 8,757,629 | B2 | 6/2014 | Barnes |
| 10,035,722 | B2 | 7/2018 | Sveinsbo et al. |
| 10,201,955 | B2 | 2/2019 | Badger |
| 10,370,523 | B2 | 8/2019 | Chao et al. |
| 2002/0162598 | A1* | 11/2002 | Kaspersion .......... B23D 61/006 |
| | | | 264/138 |
| 2003/0213525 | A1 | 11/2003 | Patel et al. |
| 2015/0044369 | A1 | 2/2015 | Keener et al. |
| 2016/0341350 | A1 | 11/2016 | Sapsai et al. |
| 2016/0341352 | A1 | 11/2016 | Sapsai et al. |
| 2017/0009914 | A1* | 1/2017 | Badger .............. F16L 55/0336 |
| 2018/0282524 | A1 | 10/2018 | Chao et al. |

OTHER PUBLICATIONS

Office Action from CN Application No. 202080064529.3 dated Oct. 20, 2023.

Office Action from CN Application No. 202080064529.3 dated Feb. 5, 2024.

International Search Report and Written Opinion from PCT/US20/48421 dated Jan. 21, 2021.

Office Action from EA Application No. 202291024 dated Jun. 30, 2023.

Extended European Search Report from EP Application No. 20856616.6 dated Aug. 17, 2023.

Office Action from CA Application No. 3,152,517 dated May 2, 2025.

Office Action from KR Application No. 10-2022-7008997 dated Mar. 12, 2025.

Office Action from EP Application No. 20856616.6 dated Mar. 12, 2025.

Foster® Flextrar Sealant, 95-50 Product Data Sheet, 2 pages, Aug. 31, 2017.

Office Action from IN Application No. 202237011179 dated Sep. 30, 2025.

Foamglas-3.mov, Generalinsulation32, retrieved from https://www.youtube.com/watch?v=nxqTpfEiStl, Dec. 11, 2010.

Foster® Flextra® Sealant, 95-50 Product Data Sheet, 2 pages, Aug. 31, 2017.

Office Action from EP Application No. 20856616.6 dated Nov. 27, 2025.

Office Action from KR Application No. 10-2022-7008997 dated Dec. 30, 2025.

* cited by examiner

100

120

110

L

130

300

200

400

400

LOW VISCOSITY SEALANT TO PREVENT CORROSION UNDER INSULATION

CROSS-REFERENCE TO RELATED APPLICATIONS

This application is the U.S. national stage entry of International Application No. PCT/US2020/048421, filed Aug. 28, 2020, which claims priority to and the benefit of U.S. Provisional Application No. 62/893,882, filed Aug. 30, 2019, the entire contents of which are incorporated by reference herein.

FIELD

The present invention relates to insulation systems for pipes and vessels, and more particularly, to systems that avoid the problems associated with corrosion occurring between insulation and the underlying metal surfaces.

BACKGROUND

Conventional pipe insulation may be made from a variety of materials ranging from flexible materials such as plastics and foam rubbers to those that are more rigid such as thermosetting plastics and cellular glass.

Cellular glass may be fabricated into sections for insulating industrial and commercial pipes or vessels. Cellular glass is a preferred choice for certain insulation applications due to its ability to maintain its shape under strenuous conditions and its closed-cell makeup, making it impermeable to vapor. While insulating these applications provides the necessary purpose of energy conservation or process control, other problems may arise. For instance, corrosion under insulation (CUI) may occur under insulation where moisture has been trapped or otherwise allowed to migrate between the insulation and the pipe or vessel which are typically composed of metal. The temperature range for CUI generally occurs between 32° F. and 400° F. This includes liquid water that is trapped under the insulation and has not been allowed to evaporate or be removed from the system.

Therefore, a need exists for an insulation system that can provide adequate insulation to pipes and vessels yet also prevents corrosion along the insulation and metal interface.

SUMMARY

The general inventive concepts are based, in part, on the discovery that conventional, higher viscosity, sealants combined with the area of application of the sealant, may allow for unwanted water infiltration between the pipe and cellular glass insulation systems. During conventional installation, higher viscosity sealants may not be installed properly and the sealant is not compressed in a fashion to efficiently reduce or eliminate the space between the pipe or vessel and the insulation. Lower viscosity sealants, on the other hand, may be compressed to a greater extent to create more surface area coverage for the sealant. The lower viscosity sealant allows for both improved sealing from moisture ingress as well as for a tighter insulation joint which limits thermal breaks. Further, by initially applying the sealant to the inner portion of a side joint section (at the interface between the pipe bore and the side joint section), the lower viscosity sealant is forced into the pipe bore interface, creating additional sealing between the pipe and the cellular glass insulation. The application of the sealant at the interface between the insulation and the pipe or vessel interface creates a compartmentalized insulation system that greatly inhibits water and moisture migration if the system is compromised.

In certain exemplary embodiments, the general inventive concepts contemplate a cellular glass insulation system. The cellular glass insulation system comprises a plurality of cellular glass insulation segments and a low viscosity sealant. The cellular glass insulation segments comprising a length, side joint sections, an inner pipe bore, and end joint sections. The low viscosity sealant is positioned along the length of the cellular glass insulation segment at an interface between the side joint section and the inner pipe bore. In the case of a vessel or tank, the sealant is applied in the same manner.

In certain exemplary embodiments, the general inventive concepts contemplate a method of insulating a pipe. The method comprises providing a cellular glass insulation segment and a low viscosity sealant, the cellular glass insulation segment comprising a length, an inner pipe bore or vessel surface, side joint sections extending the length of the cellular glass insulation segment between the inner pipe bore and an exterior of the cellular glass insulation segment, and end joint sections; applying the low viscosity sealant along an interface between the inner pipe bore and at least one side joint section; and positioning the cellular glass insulation system about the exterior of a pipe.

Other aspects and features of the general inventive concepts will become more readily apparent to those of ordinary skill in the art upon review of the following description of various exemplary embodiments in conjunction with the accompanying figures.

BRIEF DESCRIPTION OF THE DRAWINGS

The general inventive concepts, as well as embodiments and advantages thereof, are described below in greater detail, by way of example, with reference to the drawings in which.

DETAILED DESCRIPTION

Figure 1:
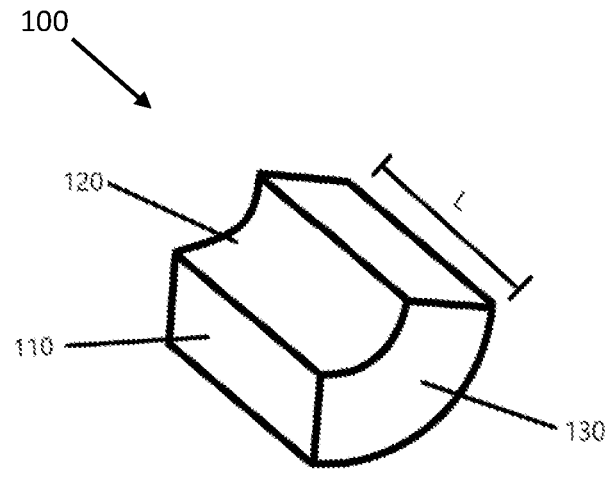
FIG. 1 shows an illustration of a conventional cellular glass insulation segment.

Several illustrative embodiments will be described in detail with the understanding that the present disclosure merely exemplifies the general inventive concepts. Embodiments encompassing the general inventive concepts may take various forms and the general inventive concepts are not intended to be limited to the specific embodiments described herein.

While various exemplary embodiments are described or suggested herein, other exemplary embodiments utilizing a variety of methods and materials similar or equivalent to those described or suggested herein are encompassed by the general inventive concepts.

Unless defined otherwise, all technical and scientific terms used herein have the same meaning as commonly understood by one of ordinary skill in the art to which the invention belongs. In this connection, unless otherwise indicated, concentrations of ingredients given in this document refer to the concentrations of these ingredients in the master batch or concentrate, in keeping with customary practice.

The term "low viscosity" as used herein refers to a sealant that has a viscosity lower than those used conventionally in pipe and vessel insulation applications. Viscosities stated in this document are measured with an RV-7 spindle at 10 revolutions per minute. Typically, pipe and vessel insulation sealants have a viscosity of above about 400,000 cPoise, which would be considered a higher viscosity sealant for the purposes of the general inventive concepts. In general, low viscosity sealants according to the general inventive concepts include those having a viscosity below about 300,000 cPoise but are highly dependent upon the composition of the sealant. In certain exemplary embodiments, the sealant should be designed so that a ¼ inch wide bead of the sealant allows for a minor sag in the range of 0.2 inch to 1 inch when placed upon a vertical surface. In this manner, the sealant should have a very low viscosity but also have adequate body to allow the installer to apply the low viscosity sealant on a surface and have adequate time to install the insulation without the sealant from dislodging from the application surface. Examples of suitable sealants include butyls, silicones, polyurethanes, polysulfides, and silane-modified polymers. The viscosity referenced in this document is for newly manufactured sealants. Those of ordinary skill in the art will recognize that the viscosity of a sealant according to the general inventive concepts will tend to drift over time and generally increase. In this manner, the preferred viscosity referenced may increase by 100,000 cPoise or more over the expected shelf life of the sealant. The terms un-aged and as manufactured with respect to low viscosity sealants refers to the manufacturer's measurement of the viscosity or a measurement performed after a short period of time after original manufacturing.

The general inventive concepts relate to systems for and methods of insulating a pipe or similar structure. The intrusion of moisture into an insulation system can cause significant complications to a industrial facility or a building owner. In particular, the ingress of water can promote corrosion under the insulation as well as degrade the desired insulating properties of the system. Corrosion under insulation (CUI) is a major issue within systems operating at temperatures where water may exist in a liquid state. For example, even high temperature equipment may show CUI when the liquid water cycles onto the equipment surface during shutdowns or system cycling. CUI is particularly aggressive in above-ambient systems (e.g., operating above 150° F.-170° F.).

In the case of cellular glass, the corrosion is the result of moisture penetrating the spaces between the cellular glass joints. In order to avoid corrosion under insulation and degraded thermal characteristics, an effective insulation system needs to prevent the intrusion of water into the system and also onto the pipe or vessel surface. If water does infiltrate the sealed system (due to damage or other circumstances) the insulation system still needs to be able to contain/isolate the moisture ingress to prevent further damage.

Cellular glass is a non-porous closed-cell foam material that is rigid in structure and has a water permeability of zero. Having such a low permeability means that cellular glass will not allow water into a system that is properly sealed. Because cellular glass is not flexible, in order to form customized insulation products, cellular glass must be formed into fabricated sections (e.g., half, quarter sections, or segments) that fit around the exterior of the pipe. When considering larger vessels, fabrication may not be required to the large diameter of the structures. Because it is a closed-cell, impermeable foam, water does not penetrate the cellular glass structure. Thus, any water in the interface between the pipe and the cellular glass is the result of infiltration through the joints between cellular glass segments or at an opening between the piping or vessel and the insulation such as a termination.

While the general inventive concepts are applicable to a variety of insulation systems, the cellular glass for use according to the general inventive concepts is characterized by a stable thermal conductivity that does not substantially change when exposed to high moisture environments. The cellular glass insulation is uniquely characterized within the insulation market since the product utilized an insulating cell gas composition that cannot escape the glass structure. In this manner, the cellular glass is unique in that the thermal conductivity is maintained at a constant even if exposed to moisture. The constant thermal conductivity and impermeability can only be compromised through either physically changing the product through either mechanical means or through a similar process.

FIG. 1 shows an exemplary ¼ segment of cellular glass pipe insulation 100. While the segment is illustrated herein as quarter and half segments, those of ordinary skill will understand that a variety of segment combinations are contemplated and would be suitable for the general inventive concepts. Accordingly, it is not intended that the general inventive concepts be limited to those specific embodiments described herein. The cellular glass pipe insulation is defined by a length L, side joint sections 110, an inner pipe bore 120, and end joint sections 130. The inner pipe bore defines the area in which the pipe will by positioned between the cellular glass pipe insulation segments and is adapted for fitting around an arc of the exterior of the pipe. The end joint sections are substantially flat and extend the length of the cellular glass pipe insulation segment between the inner pipe bore and the exterior cellular glass pipe insulation segment. During installation, the individual insulation segments are fitted about the pipe and sealant is provided along the side joint sections.

Figure 2:
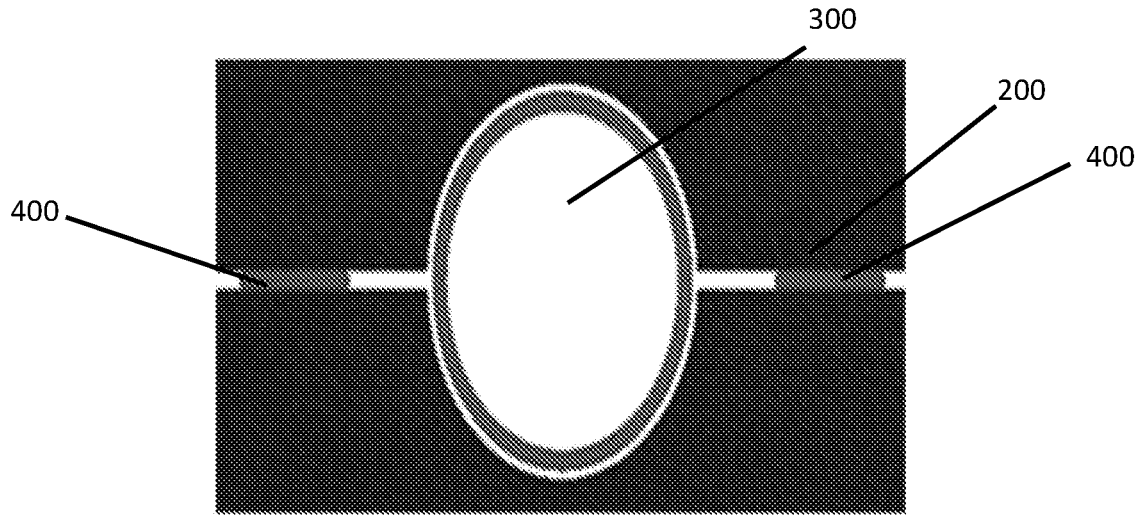
FIG. 2 shows an example of a conventional cellular glass insulation positioned around a pipe.

FIG. 2 shows a conventional cellular glass pipe insulation system. In this embodiment, the pipe 300, is substantially surrounded by two segments of cellular glass insulation 200. The interface where the foam glass segments meet is with a sealant 400. The sealant is traditionally of a high viscosity sealant (e.g., above about 400,000 cPoise). A higher viscosity sealant is generally utilized since a high body, non-sag property is advantageous in other markets that require sealing. For example, many applications require the filling and sealing of gap and therefore lower viscosity/low sag sealants are essential. Because the purpose of the sealant is to close off the joint between adjacent foam glass segments, the sealant is generally applied to the joint sections, which are then mated together around the pipe, compressing the sealant between the insulation segments. In addition, the lower viscosity sealant must penetrate the fine cell structure of the cellular glass surface to provide a tight seal. The cell structure to the cellular glass is generally less than 2 mm per cell and a lower viscosity sealant can more easily penetrate the cell structure surface. The purpose of the sealant is to adhere the individual segments of foam glass together and to form a barrier to prevent water intrusion at the joints. However, using high viscosity sealants has been demonstrated to cause an unwanted thermal break gap between the cellular glass and the pipe itself.

Figure 3:
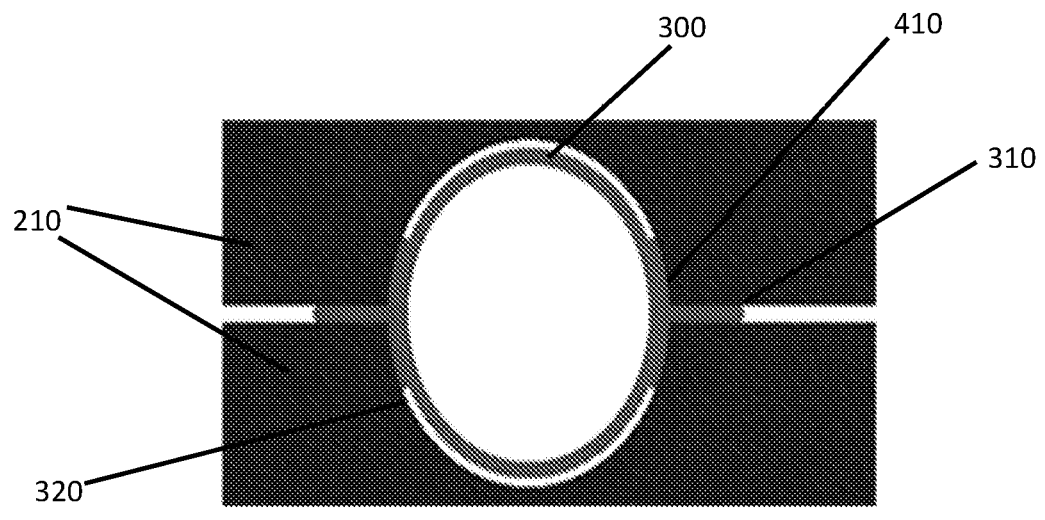
FIG. 3 shows an embodiment of a cellular glass insulation system positioned around a pipe according to the general inventive concepts.

In contrast, FIG. 3 shows a pipe insulation system according to the general inventive concepts. Much as in the conventional approach, the pipe is substantially surrounded by two segments of cellular glass insulation. These segments are fitted around the pipe 300 with a sealant 410 disposed in the interfaces between the two segments. The inventive concepts contemplate providing the sealant in the inner portion of the side joint section 310, closest to the inner pipe bore 320. The sealant is then compressed during installation, forcing the sealant into the dual interface between the pipe and the individual segments. As can be seen from the figure, application of the sealant on the inner area of the joint section allows the sealant to be compressed into contact with the outer arc of the pipe, in addition to contacting both of the insulation segments. Further compression of the joints shown in FIG. 3 will allow for a very thin joint that has a very small gap or space between adjacent pieces of insulation and also has superior filling of the cells of the insulation that are located within the sealed joint.

Figure 4:
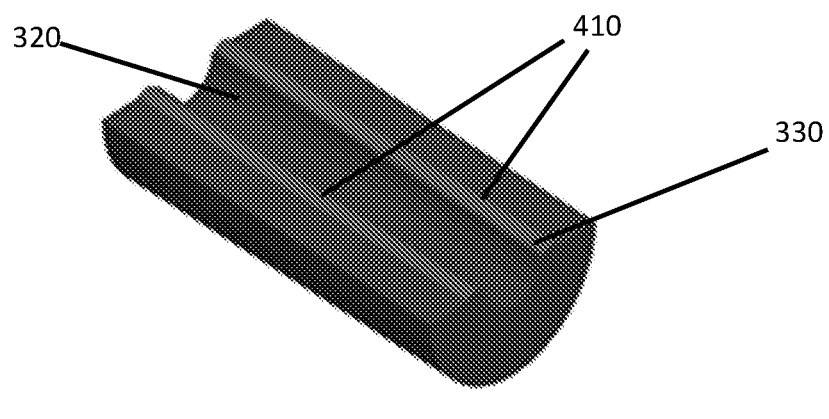
FIG. 4 shows an embodiment of a cellular glass insulation segment with low viscosity sealant applied thereto according to an embodiment of the general inventive concepts.

FIG. 4 shows an exemplary embodiment of a cellular glass insulation segment according to the general inventive concepts prior to installation about a pipe. Low viscosity sealant 410 is applied substantially along the length of the interface between the side joint section and the inner pipe bore 320. Low viscosity sealant is also applied to the end joint section 330. In this way, the insulation segments that fit about a length of pipe are sealed together upon installation and compression of the low viscosity sealant and adjacent lengths of pipe insulation are also sealed together to prevent CUI. The sealant in FIG. 4 is shown as applied in a bead but may also be either further smoothed with a trowel or applied directly to the surface with a trowel or similar tool.

While not wishing to be bound by theory, it is believed that this increased contact between the sealant and the pipe provides more effective sealing (and water impermeability) to the pipe insulation system. This has the dual benefits of increasing water impermeability overall and also isolating any corrosion that should develop. The improved sealing also provides a strong mechanical bond between both the adjacent pieces of sealed insulation and to the pipe or vessel substrate.

Accordingly, the general inventive concepts are based, in part, on the dual discoveries that higher viscosity sealants combined with the area of application of the sealant, allowed for unwanted water infiltration between the pipe and the cellular glass. Despite well-accepted consensus that higher viscosity sealants would perform better, the higher viscosity sealants were not compressed in a fashion to efficiently reduce or eliminate the space between the pipe and the insulation. Lower viscosity sealants, on the other hand, may be more readily compressed to a greater extent to create more surface area coverage for the sealant. Further, by initially applying the sealant to the inner portion of the side joint section (at the interface between the pipe bore and the side joint section) the lower viscosity sealant is forced into the pipe bore, creating additional sealing between the pipe and the cellular glass insulation, further preventing intrusion of water.

In certain exemplary embodiments, the cellular glass insulation system comprises a plurality of cellular glass insulation segments and a low viscosity sealant. In certain exemplary embodiments, the low viscosity sealant has a viscosity of below about 300,000 cPoise but also is low sagging when applied to a vertical surface. In certain exemplary embodiments, the low viscosity sealant has a viscosity of below about 275,000 cPoise. In certain exemplary embodiments, the low viscosity sealant has a viscosity of below about 250,000 cPoise. In certain exemplary embodiments, the low viscosity sealant has a viscosity of below about 225,000 cPoise. In certain exemplary embodiments, the low viscosity sealant has a viscosity of below about 200,000 cPoise. In certain exemplary embodiments, the low viscosity sealant has a viscosity of about 80,000 to about 200,000 cPoise. In certain exemplary embodiments, the low viscosity sealant has a viscosity of about 80,000 to about 225,000 cPoise. In certain exemplary embodiments, the low viscosity sealant has a viscosity of about 80,000 to about 250,000 cPoise. In certain exemplary embodiments, the low viscosity sealant has a viscosity of about 80,000 to about 275,000 cPoise. In certain exemplary embodiments, the low viscosity sealant has a viscosity of about 80,000 to about 300,000 cPoise. The lower limit of the sealant is however highly variable depending upon the sealant fillers and other modifiers such as plasticizers.

As mentioned, the general inventive concepts contemplate a method of insulating a pipe. The method comprises providing a cellular glass insulation segment and a low viscosity sealant. The cellular glass insulation segment comprising a length, and inner pipe bore, side joint sections extending the length of the cellular glass insulation segment between the inner pipe bore and an exterior of the cellular glass insulation segment. Applying the sealant along an interface between the inner pipe bore and at least one side joint section. Positioning the cellular glass insulation system about the exterior of a pipe. In certain exemplary embodiments, the low viscosity sealant is also applied to an end joint section of the cellular glass insulation segment.

All references to singular characteristics or limitations of the present disclosure shall include the corresponding plural characteristic or limitation, and vice versa, unless otherwise specified or clearly implied to the contrary by the context in which the reference is made.

All combinations of method or process steps as used herein can be performed in any order, unless otherwise specified or clearly implied to the contrary by the context in which the referenced combination is made.

All ranges and parameters, including but not limited to percentages, parts, and ratios, disclosed herein are understood to encompass any and all sub-ranges assumed and subsumed therein, and every number between the endpoints. For example, a stated range of "1 to 10" should be considered to include any and all subranges between (and inclusive of) the minimum value of 1 and the maximum value of 10; that is, all subranges beginning with a minimum value of 1 or more (e.g., 1 to 6.1), and ending with a maximum value of 10 or less (e.g., 2.3 to 9.4, 3 to 8, 4 to 7), and finally to each number 1, 2, 3, 4, 5, 6, 7, 8, 9, and 10 contained within the range.

The cellular glass compositions, and corresponding methods of the present disclosure can comprise, consist of, or consist essentially of the essential elements and limitations of the disclosure as described herein, as well as any additional or optional ingredients, components, or limitations described herein or otherwise useful in foam glass composition applications.

The cellular glass compositions of the present disclosure may also be substantially free of any optional or selected ingredient or feature described herein, provided that the remaining composition still contains all of the required elements or features as described herein. In this context, and unless otherwise specified, the term "substantially free" means that the selected composition contains less than a functional amount of the optional ingredient, typically less than 0.1% by weight, and also including zero percent by weight of such optional or selected essential ingredient.

To the extent that the terms "include," "includes," or "including" are used in the specification or the claims, they are intended to be inclusive in a manner similar to the term "comprising" as that term is interpreted when employed as a transitional word in a claim. Furthermore, to the extent that the term "or" is employed (e.g., A or B), it is intended to mean "A or B or both A and B." When the Applicant intends to indicate "only A or B but not both," then the term "only A or B but not both" will be employed. Thus, use of the term "or" herein is the inclusive, and not the exclusive use. In the present disclosure, the words "a" or "an" are to be taken to include both the singular and the plural. Conversely, any reference to plural items shall, where appropriate, include the singular.

In some embodiments, it may be possible to utilize the various inventive concepts in combination with one another. Additionally, any particular element recited as relating to a particularly disclosed embodiment should be interpreted as available for use with all disclosed embodiments, unless incorporation of the particular element would be contradictory to the express terms of the embodiment. Additional advantages and modifications will be readily apparent to those skilled in the art. Therefore, the disclosure, in its broader aspects, is not limited to the specific details presented therein, the representative apparatus, or the illustrative examples shown and described. Accordingly, departures may be made from such details without departing from the spirit or scope of the general inventive concepts.

While the invention has been illustrated and described in detail in the drawings and foregoing description, the same is to be considered as illustrative and not restrictive in character. It should be understood that only the exemplary embodiments have been shown and described and that all changes and modifications that come within the spirit of the invention are desired to be protected.

The invention claimed is:

1. A cellular glass insulation system comprising a plurality of cellular glass insulation segments and a low viscosity sealant,
    wherein the cellular glass insulation segments have a length, side joint sections, an inner pipe bore, and end joint sections,
    wherein the low viscosity sealant is positioned along the length of the cellular glass insulation segment at an interface between the side joint section and the inner pipe bore, and on at least one end joint section;
    wherein the low viscosity sealant has an un-aged, as manufactured viscosity of 300,000 cPoise to 80,000 cPoise.

2. The cellular glass insulation system of claim 1, wherein the low viscosity sealant has an un-aged, as manufactured viscosity of below 200,000 cPoise.

3. The cellular glass insulation system of claim 1, wherein the low viscosity sealant has an un-aged, as manufactured viscosity of 200,000 cPoise to 80,000 cPoise.

4. The cellular glass insulation system of claim 1, wherein the low viscosity sealant is compressed into an interface between the pipe and the inner pipe bore.

5. The cellular glass insulation system of claim 1, wherein the cellular glass has a thermal conductivity that, due to the enclosed insulating gases, does not degrade with time or exposure to moisture in the environment.

6. A method of insulating a pipe, the method comprising providing a first cellular glass insulation segment, a second cellular glass segment, and a low viscosity sealant,
    each of the cellular glass insulation segments having a length, an inner pipe bore, side joint sections extending the length of the cellular glass insulation segment between the inner pipe bore and an exterior surface of the cellular glass insulation segment of at least one of the cellular glass insulation segments;
    applying the low viscosity sealant along an interface between the inner pipe bore or vessel and at least one side joint section;
    applying the low viscosity sealant on at least one end joint section;
    positioning the cellular glass insulation segments about the exterior of a pipe or vessel;
    wherein the low viscosity sealant has an un-aged, as manufactured viscosity of 300,000 cPoise to 80,000 cPoise.

7. The method of claim 6 further comprising pressing the cellular glass insulation segments together to compress the sealant into an interface between the pipe and the inner pipe bore.

8. The method of claim 6, wherein the low viscosity sealant is applied along the entire length of at least one side joint section of at least one of the cellular glass segment.

9. The method of claim 6, wherein low viscosity sealant is applied along the length each side joint section.

10. The method of claim 6, wherein the low viscosity sealant has a viscosity below 200,000 cPoise.

11. The method of claim 6, wherein the low viscosity sealant has a viscosity of 200,000 cPoise to 80,000 cPoise.

12. The method of claim 6, wherein the cellular glass has a non-aging thermal conductivity of ranging from 0.2 to 0.5 BTU in/hr ft$^2$F as measured at 24 C.

13. A cellular glass insulation system comprising a plurality of cellular glass insulation segments and a low viscosity sealant,
    wherein the cellular glass insulation segments have a length, side joint sections, an inner pipe bore, and end joint sections,
    wherein the low viscosity sealant is positioned along the length of the cellular glass insulation segment at an interface between the side joint section and the inner pipe bore, and on at least one end joint section;
    wherein the low viscosity sealant has an un-aged, as manufactured viscosity of below 225,000 cPoise to 80,000 cPoise.

14. The cellular glass insulation system of claim 13, wherein the low viscosity sealant is compressed into an interface between the pipe and the inner pipe bore.

15. The cellular glass insulation system of claim 13, wherein the cellular glass has a thermal conductivity that, due to the enclosed insulating gases, does not degrade with time or exposure to moisture in the environment.

* * * * *